US009514001B2

(12) United States Patent
Guo et al.

(10) Patent No.: US 9,514,001 B2
(45) Date of Patent: Dec. 6, 2016

(54) INFORMATION PROCESSING DEVICE, DATA MANAGEMENT METHOD, AND STORAGE DEVICE

(71) Applicant: FUJITSU LIMITED, Kawasaki-shi, Kanagawa (JP)

(72) Inventors: Zhaogong Guo, Koto (JP); Koichi Yasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 175 days.

(21) Appl. No.: 13/658,970

(22) Filed: Oct. 24, 2012

(65) Prior Publication Data
US 2013/0173877 A1 Jul. 4, 2013

(30) Foreign Application Priority Data

Dec. 28, 2011 (JP) ................................. 2011-287948

(51) Int. Cl.
*G06F 12/00* (2006.01)
*G06F 11/14* (2006.01)
*G06F 21/57* (2013.01)
*G06F 21/88* (2013.01)

(52) U.S. Cl.
CPC ....... *G06F 11/1456* (2013.01); *G06F 11/1464* (2013.01); *G06F 11/1469* (2013.01); *G06F 21/575* (2013.01); *G06F 21/88* (2013.01); *G06F 2221/2143* (2013.01)

(58) Field of Classification Search
CPC .............. G06F 11/1456; G06F 11/1464; G06F 11/1469
USPC .................................................. 711/161, 162
See application file for complete search history.

(56) References Cited

U.S. PATENT DOCUMENTS

| 6,901,298 | B1 * | 5/2005 | Govindaraj et al. ............ 700/21 |
| 2002/0072350 | A1 * | 6/2002 | Fukuzato ...................... 455/412 |
| 2003/0074569 | A1 | 4/2003 | Yamauchi et al. |
| 2009/0093235 | A1 | 4/2009 | Grealish et al. |
| 2011/0047033 | A1 * | 2/2011 | Mahaffey et al. ......... 705/14.66 |

(Continued)

FOREIGN PATENT DOCUMENTS

| JP | 2000-284997 | 10/2000 |
| JP | 2002-312249 | 10/2002 |

(Continued)

OTHER PUBLICATIONS

Japanese Office Action dated May 19, 2015 in corresponding Japanese Patent Application No. 2011-287948, 5 pages.

*Primary Examiner* — Gurtej Bansal
(74) *Attorney, Agent, or Firm* — Staas & Halsey LLP

(57) ABSTRACT

According to an aspect of the present invention, provided is an information processing device including a first storage unit and a processor. The processor sets, in an external device, device identification information of the information processing device. The processor stores a duplicate copy of data stored in the first storage unit in a second storage unit included in the external device. The processor invalidates, in response to an instruction for invalidating data, the data stored in the first storage unit. The processor restores the duplicate copy stored in the second storage unit on the first storage unit at a time of start-up of the information processing device after the invalidation when the external device is connected to the information processing device and the device identification information is set in the external device.

6 Claims, 16 Drawing Sheets

(56) References Cited

U.S. PATENT DOCUMENTS

2012/0310889 A1* 12/2012 McNeil .............. H04L 67/2857
  707/639

FOREIGN PATENT DOCUMENTS

| JP | 2005-151140 | 6/2005 |
| JP | 2009-217577 | 9/2009 |
| JP | 2009-217580 | 9/2009 |
| JP | 2010-097428 | 4/2010 |
| JP | 2010-541479 | 12/2010 |

* cited by examiner

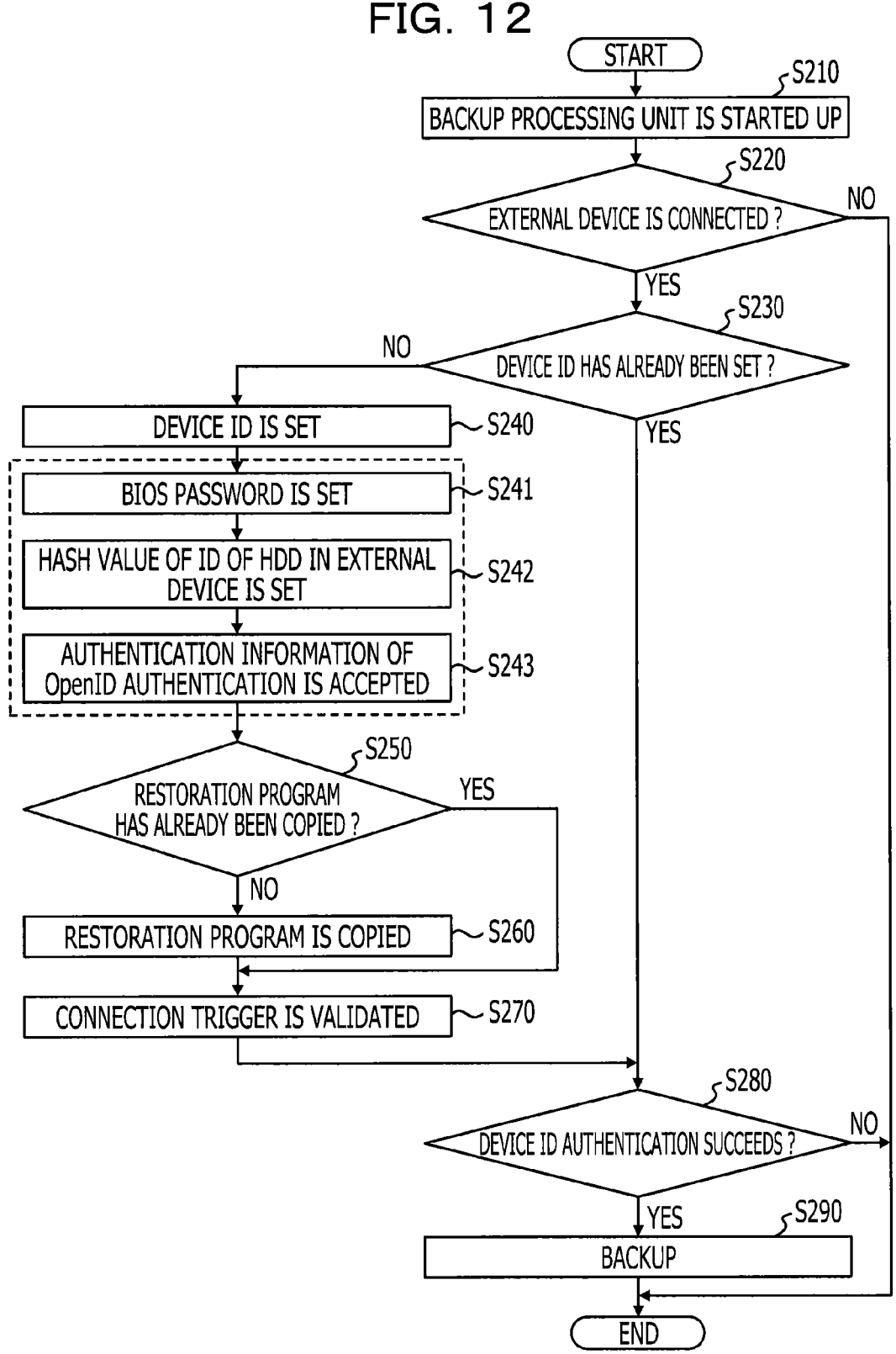

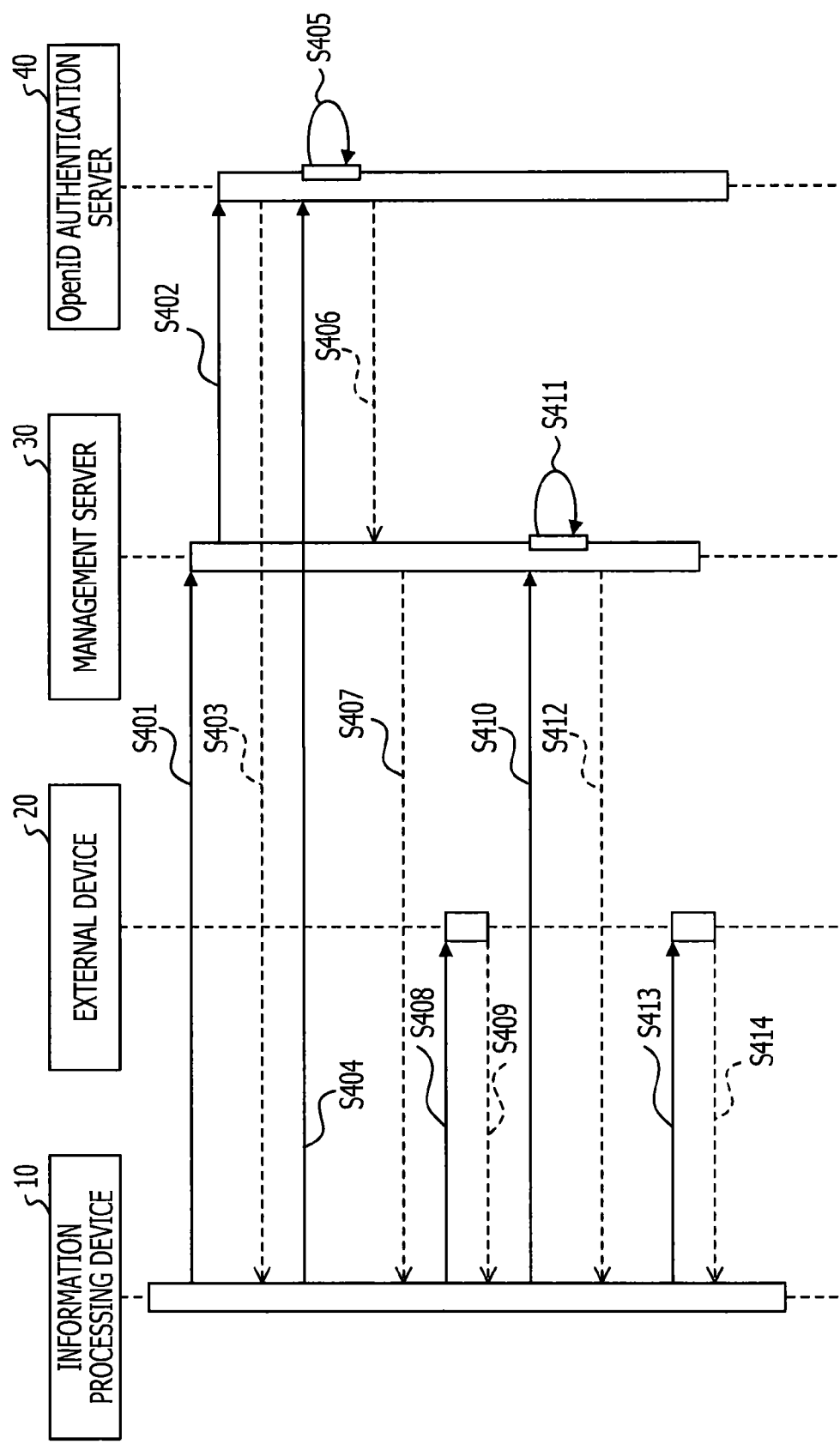

… (US 9,514,001 B2)

INFORMATION PROCESSING DEVICE, DATA MANAGEMENT METHOD, AND STORAGE DEVICE

CROSS-REFERENCE TO RELATED APPLICATION

This application is based upon and claims the benefit of priority of the prior Japanese Patent Application No. 2011-287948, filed on Dec. 28, 2011, the entire contents of which are incorporated herein by reference.

FIELD

The embodiments discussed herein are related to an information processing device, a data management method, and a storage device.

BACKGROUND

While notebook personal computers (PCs) have prevailed, there have been growing concerns about leakage of information due to the loss or theft of notebook PCs. Therefore, notebook PCs capable of erasing data stored in a hard disk drive (HDD) by remote control have been on sale. In addition, a solution corresponding to such notebook PCs has also been provided.

A user having recognized the loss of a notebook PC transmits, via Internet, an instruction for remotely erasing data to a management server operated by a provider of the above-mentioned solution. The management server erases, using a network, data within an HDD in the notebook PC. As a result, even if the lost notebook PC has fallen into someone's hands, it may be possible to block the leakage or the like of confidential information or the like.

Japanese Laid-open Patent Publication No. 2010-97428, Japanese Laid-open Patent Publication No. 2009-217577, and Japanese Laid-open Patent Publication No. 2009-217580 disclose related techniques.

SUMMARY

According to an aspect of the present invention, provided is an information processing device including a first storage unit and a processor. The processor sets, in an external device, device identification information of the information processing device. The processor stores a duplicate copy of data stored in the first storage unit in a second storage unit included in the external device. The processor invalidates, in response to an instruction for invalidating data, the data stored in the first storage unit. The processor restores the duplicate copy stored in the second storage unit on the first storage unit at a time of start-up of the information processing device after the invalidation when the external device is connected to the information processing device and the device identification information is set in the external device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a diagram illustrating a flowchart of an example of a procedure of backup processing for data of an information processing device in the third embodiment;

FIG. 14 is a sequence diagram illustrating an example of a procedure of authentication processing utilizing a hash value.

DESCRIPTION OF EMBODIMENTS

A user having recognized no sign of a notebook PC tends not to swiftly recognize that the notebook PC has been lost. The reason is that there is a possibility that the notebook PC has been misplaced in a secure location such as home or an office. Accordingly, immediately after having recognized no sign of a notebook PC, the user is reluctant to instruct to erase data within the user's own notebook PC. On the other hand, as the user spends longer time with hesitating to erase data, the risk of the leakage of data increases.

Therefore, it may be considered that the backup of data within the notebook PC is frequently performed. By doing so, it may be expected that, at the time of the loss of the notebook PC, the user's resistance to data erasing is reduced and the user swiftly instructs to remotely erase data.

However, when the notebook PC serving as a target of an instruction for remote erasure has returned to the user, there occurs a problem that it takes a lot of labor to restore the notebook PC to an original state. For example, the user notifies an administrator that the notebook PC has returned, and requests to cancel lock (remote lock) remotely put on the notebook PC, via the administrator. In other words, depending on the above-mentioned solution, in some cases, not only data has been erased but also the notebook PC has been remotely locked so as to be unable to be started up.

After the cancellation of the remote lock, the user connects a storage medium (HDD or the like) serving as a backup destination to the notebook PC, and causes the notebook PC to be started up using a compact disc (CD) read-only memory (ROM) or the like for recovery. At this time, the user modifies the start-up sequence of an operating system (OS) by the setting of a basic input/output system (BIOS) so as to perform start-up from the CD-ROM. Subsequently, the user selects a backup image to be a restoration target, from among backup images stored in the storage medium serving as a backup destination. Subsequently, the user performs area setting (definition of partitions) for an HDD of the notebook PC and performs restoration of the backup image and restarts the notebook PC.

Figure 1:
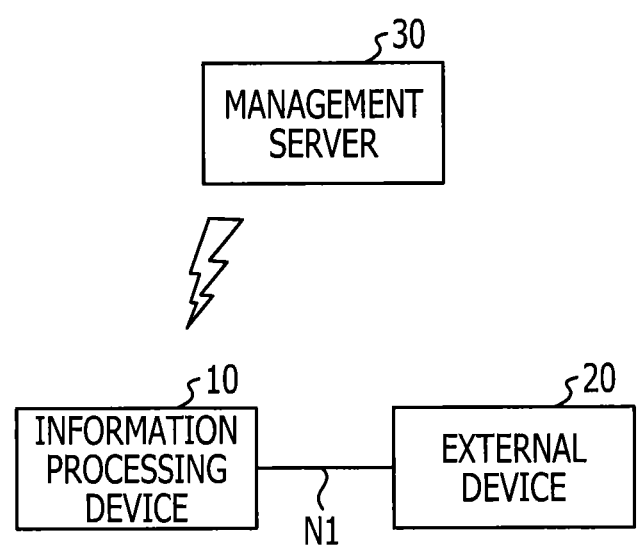
FIG. 1 is a diagram illustrating an example of a system configuration of a first embodiment.

Hereinafter, embodiments will be described with reference to the drawings. FIG. 1 is a diagram illustrating an example of a system configuration of a first embodiment. In FIG. 1, it is possible for an information processing device 10 to communicate with an external device 20 via a communication line N1. The communication line N1 may be wired or wireless. In addition, it is possible for the information processing device 10 to communicate with a management server 30 via a wireless communication network such as a mobile communication network.

In response to, for example, an instruction from a user of the information processing device 10, the management server 30 transmits, to the information processing device 10, an instruction for invalidating data stored in the information processing device 10. In response to the reception of the invalidation instruction, the information processing device 10 invalidates data stored in the information processing device 10 itself. In the present embodiment, the term "invalidation of data" means putting data into an unavailable state. As an example of the invalidation of data, erasure of data may be cited. In addition, when data is encrypted and stored in the information processing device 10, a decryption key for decrypting the encrypted data may be erased, and hence, the invalidation of data may be realized.

As is clear from the above description, the information processing device 10 includes a function capable of realizing the invalidation of data by a remote operation. The invalidation of data is performed, for example, at the time of the loss or the like of the information processing device 10. The external device 20 is used so that the management server 30 is swiftly instructed to invalidate data at the time of the loss of the information processing device 10.

Specifically, the external device 20 is used as the backup destination of data stored in the information processing device 10. For example, the external device 20 includes an HDD 22 (illustrated in FIG. 3) as a storage unit for storing backup data. As an example of the external device 20, a port replicator that contains the HDD 22 may be cited. The external device 20 may be a storage device equipped with a communication function or a computer such as a PC.

Figure 2:
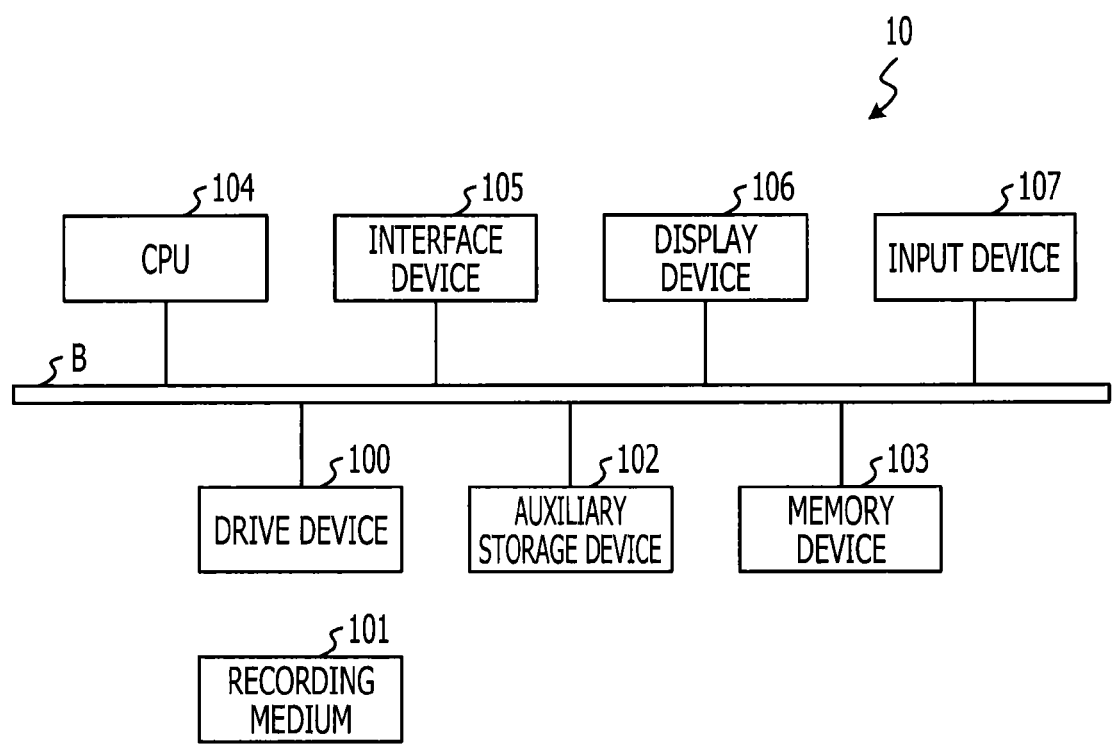
FIG. 2 is a diagram illustrating an example of a hardware configuration of an information processing device in the first embodiment.

FIG. 2 is a diagram illustrating an example of a hardware configuration of an information processing device in the first embodiment. The information processing device 10 in FIG. 2 includes a drive device 100, an auxiliary storage device 102, a memory device 103, a central processing unit (CPU) 104, an interface device 105, a display device 106, an input device 107, and the like, connected to one another using a bus B.

A program realizing processing to be performed in the information processing device 10 is provided by a recording medium 101. When a recording medium 101 storing therein the program has been set in the drive device 100, the program is installed from the recording medium 101 into the auxiliary storage device 102 via the drive device 100. The installation of the program may not be performed by the recording medium 101, and the program may be downloaded from another computer via a network. The auxiliary storage device 102 stores therein the installed program and stores therein a desirable file, desirable data, and the like.

When a start-up instruction for a program has been issued, the program is read out from the auxiliary storage device 102 and stored in the memory device 103. The CPU 104 realizes a function relating to the information processing device 10 in accordance with the program stored in the memory device 103. The interface device 105 is used as an interface for connecting to a network. The display device 106 displays a graphical user interface (GUI) and the like in accordance with a program. The input device 107 is a keyboard, a mouse, or the like, and used for inputting various operation instructions.

As an example of the recording medium 101, a portable recording medium such as a CD-ROM, a digital versatile disc (DVD), or a universal serial bus (USB) memory may be cited. As an example of the auxiliary storage device 102, an HDD, a flash memory, or the like may be cited. Each of the recording medium 101 and auxiliary storage device 102 corresponds to a computer-readable recording medium.

Figure 3:
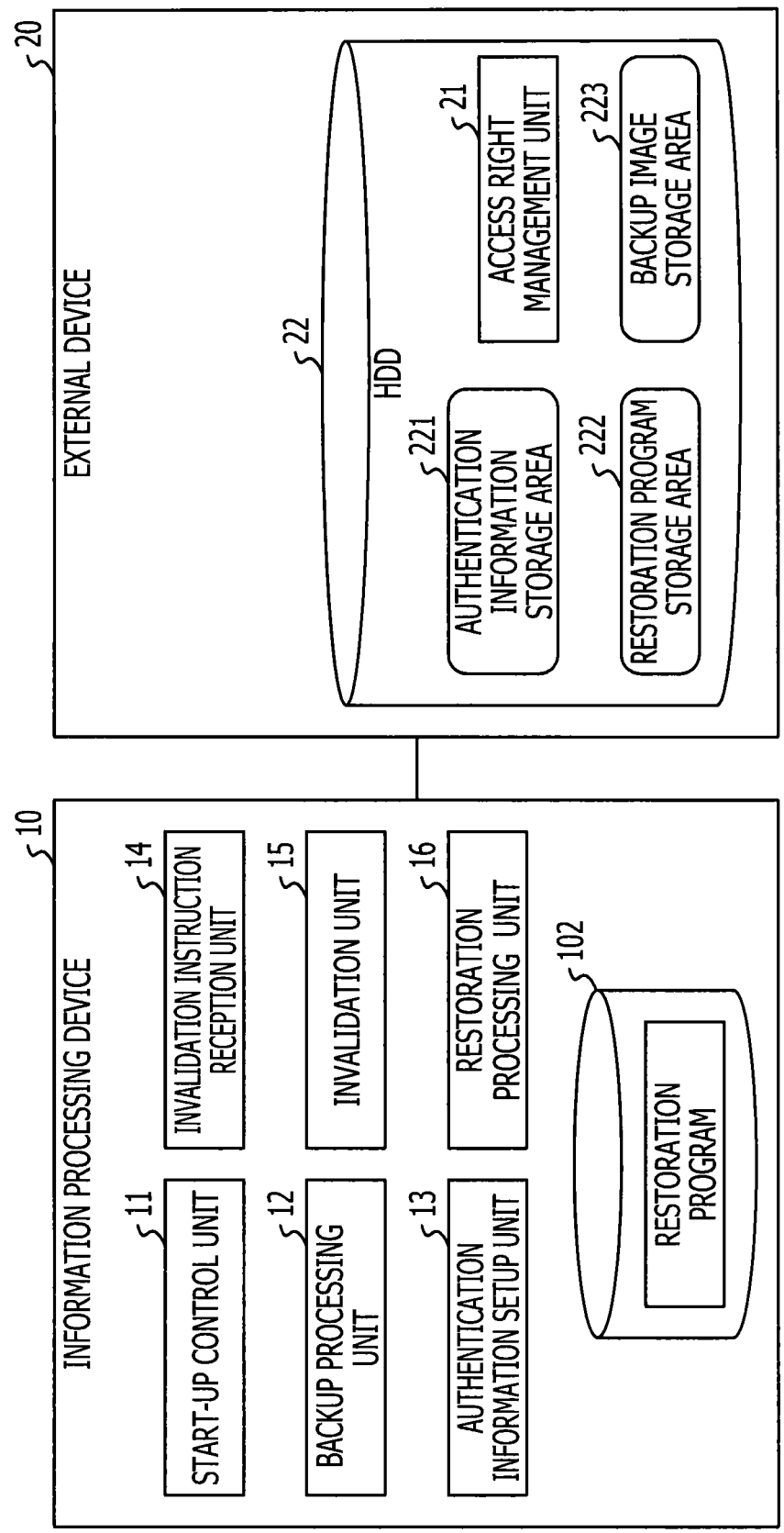
FIG. 3 is a diagram illustrating an example of a functional configuration of each device in the first embodiment.

FIG. 3 is a diagram illustrating an example of a functional configuration of each device in the first embodiment. In FIG. 3, the information processing device 10 includes a start-up control unit 11, a backup processing unit 12, an authentication information setup unit 13, an invalidation instruction reception unit 14, an invalidation unit 15, a restoration processing unit 16, and the like. A program installed into the information processing device 10 causes the CPU 104 to execute processing, and owing to the processing, these individual functional units are realized.

The invalidation instruction reception unit 14 receives an instruction for invalidating data, transmitted from the management server 30. The start-up control unit 11 controls processing at the time of start-up of the information processing device 10. The invalidation unit 15 invalidates data stored in the auxiliary storage device 102.

With respect to the data stored in the auxiliary storage device 102, the backup processing unit 12 executes processing for backing up the data to the external device 20. As a result, a backup image of the data stored in the auxiliary storage device 102 is stored in the external device 20. The authentication information setup unit 13 sets, in an authentication information storage area 221 of the HDD 22 in the external device 20, information capable of identifying the individual piece of the information processing device 10 as identification information indicating an entity (hereinafter, referred to as an "access right owner") having an access right for a backup image storage area 223 of the HDD 22 in the external device 20.

On the basis of the backup image stored in the external device 20, the restoration processing unit 16 executes restoration processing with respect to the data of the auxiliary storage device 102.

The external device 20 includes an access right management unit 21. The access right management unit 21 performs access control for the HDD 22 included in the external device 20. The authentication information storage area 221, a restoration program storage area 222, the backup image storage area 223, and the like are formed in the HDD 22. The authentication information storage area 221 stores therein identification information indicating an access right owner for the HDD 22. In other words, the identification information indicates an access right owner, and when identification information that coincides with the identification information stored in the authentication information storage area 221 is received from a request source of a request for accessing the HDD 22, the access right management unit 21 allows access to the HDD 22. If this is not the case, the access right management unit 21 limits or inhibits access to the HDD 22. The restoration program storage area 222 stores therein a copy of a restoration program stored in the auxiliary storage device 102. The backup image storage area 223 stores therein a backup image of data stored in the auxiliary storage device 102. The access right management unit 21 may be mounted out of the HDD 22. The function of the access right management unit 21 may be realized by a processor included in the external device 20 by executing a corresponding program.

Figure 4:
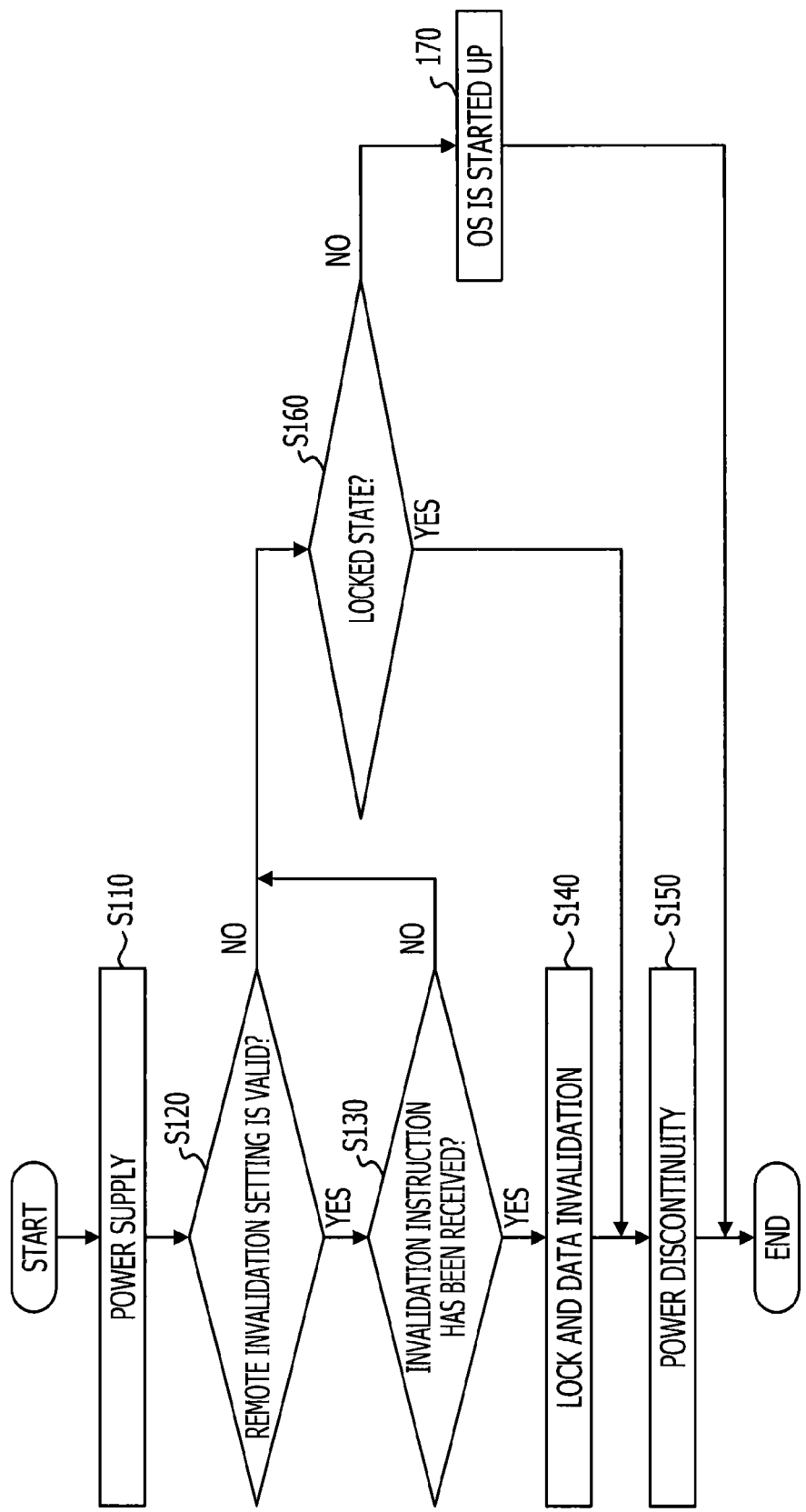
FIG. 4 is a diagram illustrating a flowchart of an example of a procedure performed when the information processing device in the first embodiment is started up.

Hereinafter, a procedure executed by the information processing device 10 will be described. FIG. 4 is a diagram illustrating a flowchart of an example of a procedure performed when the information processing device in the first embodiment is started up.

When power has been supplied to the information processing device 10 (S110), the start-up control unit 11 determines whether or not a remote invalidation setting is valid (S120). The power supply is executed when an invalidation instruction transmitted from the management server 30 has been received by the invalidation instruction reception unit 14 or a user has pushed down a power button. That is, the information processing device 10 of the present embodiment may be automatically started up in response to the reception of the invalidation instruction.

The term "remote invalidation setting" means a setting relating to whether or not a remote invalidation function is to be validated. The remote invalidation function is a function for invalidating data stored in the auxiliary storage device 102 in response to an instruction for invalidating the data, sent from the management server 30. In other words, the remote invalidation function is switched to a valid or invalid state in response to the setting of a user. Setting information indicating validity or invalidity with respect to the remote invalidation setting is stored in, for example, a storage medium in which a BIOS is stored. Accordingly, the start-up control unit 11 performs the determination in S120 with reference to the setting information.

When the remote invalidation setting is valid (S120: Yes), the start-up control unit 11 determines whether or not the invalidation instruction has been received by the invalidation instruction reception unit 14 (S130). In other words, it is determined whether or not the start-up has been performed in response to the reception of the invalidation instruction.

When the invalidation instruction has been received (S130: Yes), the invalidation unit 15 locks the start-up of the information processing device 10, and invalidates data stored in the auxiliary storage device 102 (S140). The term "locking the start-up of the information processing device 10 (hereinafter, simply referred to as "lock")" means that the information processing device 10 is put into a state where the OS is not allowed to be started up. The lock may be realized, for example, by rewriting a parameter relating to the start-up processing of the BIOS so that the information processing device 10 does not start up the OS. Subsequently, the start-up control unit 11 puts the information processing device 10 into a state of power discontinuity (S150).

On the other hand, when the remote invalidation setting is invalid (S120: No) or the invalidation instruction has not been received (S130: No), the start-up control unit 11 determines whether or not the information processing device 10 is in a locked state (S160). For example, it is determined whether or not the parameter relating to the start-up procedure of the BIOS has been rewritten so that the start-up of the OS is locked.

In the case of being in a locked state (S160: Yes), the above-mentioned S150 is executed. In the case of not being in a locked state (S160: No), the start-up control unit 11 starts up the OS (S170). As a result, the information processing device 10 is put into an available state.

By executing the processing in FIG. 4 at the time of every start-up, even if the invalidation instruction has been issued in a state where the information processing device 10 has not been started up, the information processing device 10 may be put into a locked state in response to the invalidation instruction and the invalidation of data may be executed.

When the invalidation instruction has been received when the information processing device 10 is running, S140 and S150 are promptly executed.

Figure 5:
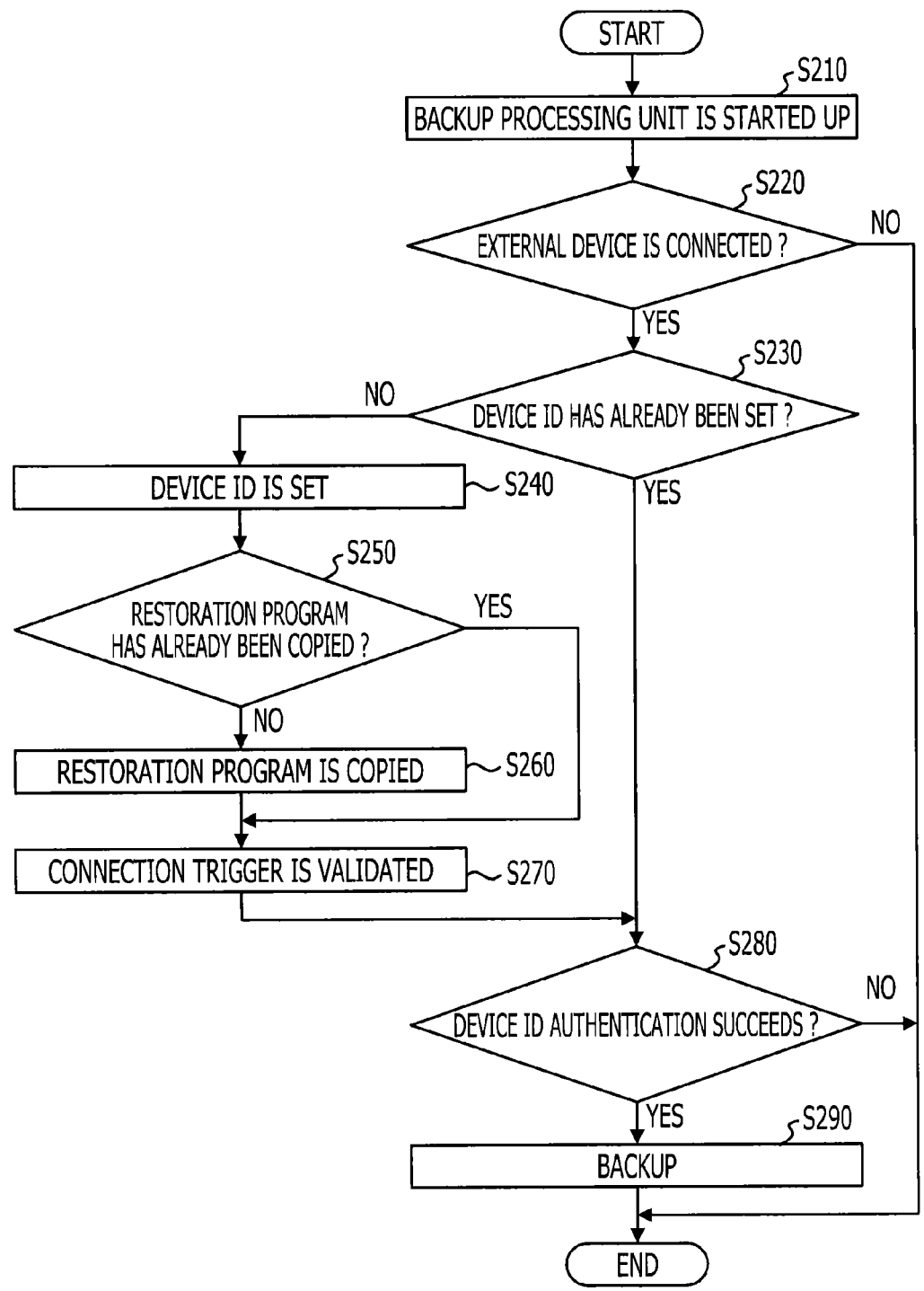
FIG. 5 is a diagram illustrating a flowchart of an example of a procedure of backup processing for data of the information processing device in the first embodiment.

Subsequently, a procedure that is executed at the time of backup of data of the information processing device 10 will be described. FIG. 5 is a diagram illustrating a flowchart of an example of a procedure of backup processing for data of an information processing device in the first embodiment. The procedure illustrated in FIG. 5 is executed at an arbitrary timing after the start-up of the OS (S170) is executed in FIG. 4 and the information processing device 10 is in an available state.

For example, when a backup instruction has been input by a user via the input device 107, the backup processing unit 12 is started up (S210). Subsequently, the backup processing unit 12 confirms whether or not the external device 20 is connected via the communication line N1 (S220). In other words, it is confirmed whether or not communication with the external device 20 is available.

When the external device 20 is not connected (S220: No), the backup processing unit 12 discontinues subsequent processing. When the external device 20 is connected (S220: Yes), the backup processing unit 12 confirms whether or not a device identifier (ID) has already been set in the authentication information storage area 221 of the HDD 22 in the external device 20 (S230). The device ID may be any information capable of identifying the individual piece of the information processing device 10. For example, the production number, media access control (MAC) address, or the like of the information processing device 10 may be used as the device ID. Alternatively, a universally unique identifier (UUID) assigned to the BIOS may be used as the device ID. Furthermore, not limited to this, any unique number of an information processing device, from and to which a user is unable to read and write, may be used as the device ID.

As described below, when the external device 20 was not used as the backup destination of the information processing device 10 in the past, the device ID of the information processing device 10 is not stored in the authentication information storage area 221 of the HDD 22 in the external device 20. Accordingly, in this case (S230: No), the authentication information setup unit 13 sets, in the authentication information storage area 221 of the HDD 22 in the external device 20, the device ID of the information processing device 10 as the identification information of an access right owner for the backup image storage area 223 (S240).

Subsequently, the backup processing unit 12 confirms whether or not the restoration program has been copied to the restoration program storage area 222 of the HDD 22 in the external device 20 (S250). When the external device 20 was not used as the backup destination of the information processing device 10 in the past, the restoration program has not been copied to the restoration program storage area 222 of the HDD 22 in the external device 20. Accordingly, in this case (S250: No), the backup processing unit 12 copies the restoration program stored in the auxiliary storage device 102, to the restoration program storage area 222 of the HDD 22 in the external device 20 (S260). A storage medium such as a CD-ROM storing therein the restoration program may be set in the drive device 100, and hence, the restoration program may be copied from the storage medium to the restoration program storage area 222. In this case, the restoration program may not be preliminarily stored in the auxiliary storage device 102.

In the case of Yes in S250 or following S260, the backup processing unit 12 validates a connection trigger (S270). The term "validating a connection trigger" means validating the modification of the setting information of the BIOS so that utmost priority is placed on the HDD 22 in the external device 20 with respect to the priority order of the start-up sequence of the OS when it has been detected that the external device 20 is connected at the time of start-up of the information processing device 10. Here, the modification of the setting information is only validated, and the modification of the setting information is performed owing to the modification of the priority order of the start-up sequence of the OS at the time of restoration.

Subsequently, the backup processing unit 12 is subjected to authentication by the access right management unit 21 in the external device 20 (S280). Specifically, the backup processing unit 12 transmits, to the access right management unit 21, an authentication request including the device ID of the information processing device 10. The access right management unit 21 determines whether or not the received device ID coincides with the device ID set in the authentication information storage area 221.

When the device ID received by the access right management unit 21 coincides with the device ID set in the authentication information storage area 221, the authentication succeeds (S280: Yes). As a result, the backup processing unit 12 is allowed to access the backup image storage area 223. Therefore, the backup processing unit 12 executes processing for backing up the data stored in the auxiliary storage device 102 to the external device 20 (S290). In other words, a backup image, which is a duplicate copy of the data stored in the auxiliary storage device 102, is stored in the backup image storage area 223 of the HDD 22 in the external device 20.

When the device ID has been set in the authentication information storage area 221 of the HDD 22 in the external device 20 (S230: Yes), processing in S280 and later is executed.

In this case, when the device ID received by the access right management unit 21 does not coincide with the device ID set in the authentication information storage area 221, the authentication fails (S280: No). As a result, the backup processing unit 12 is not allowed to access the backup image storage area 223. Accordingly, the backup processing unit 12 does not execute the backup processing. The reason is that the external device 20 is used as a backup destination of another information processing device 10. In the case where one external device 20 is used as backup destinations of a plural information processing devices 10, in the case of No in S280, processing in S240 to S270 and S290 may be executed. In this case, the backup image storage area 223 may be formed in association with each of the plural information processing devices 10, namely, each device ID. Access control by the access right management unit 21 may be executed with respect to each backup image storage area 223. Specifically, when authentication has been requested on the basis of a device ID, only access to the backup image storage area 223 corresponding to the device ID is allowed.

Figure 6:
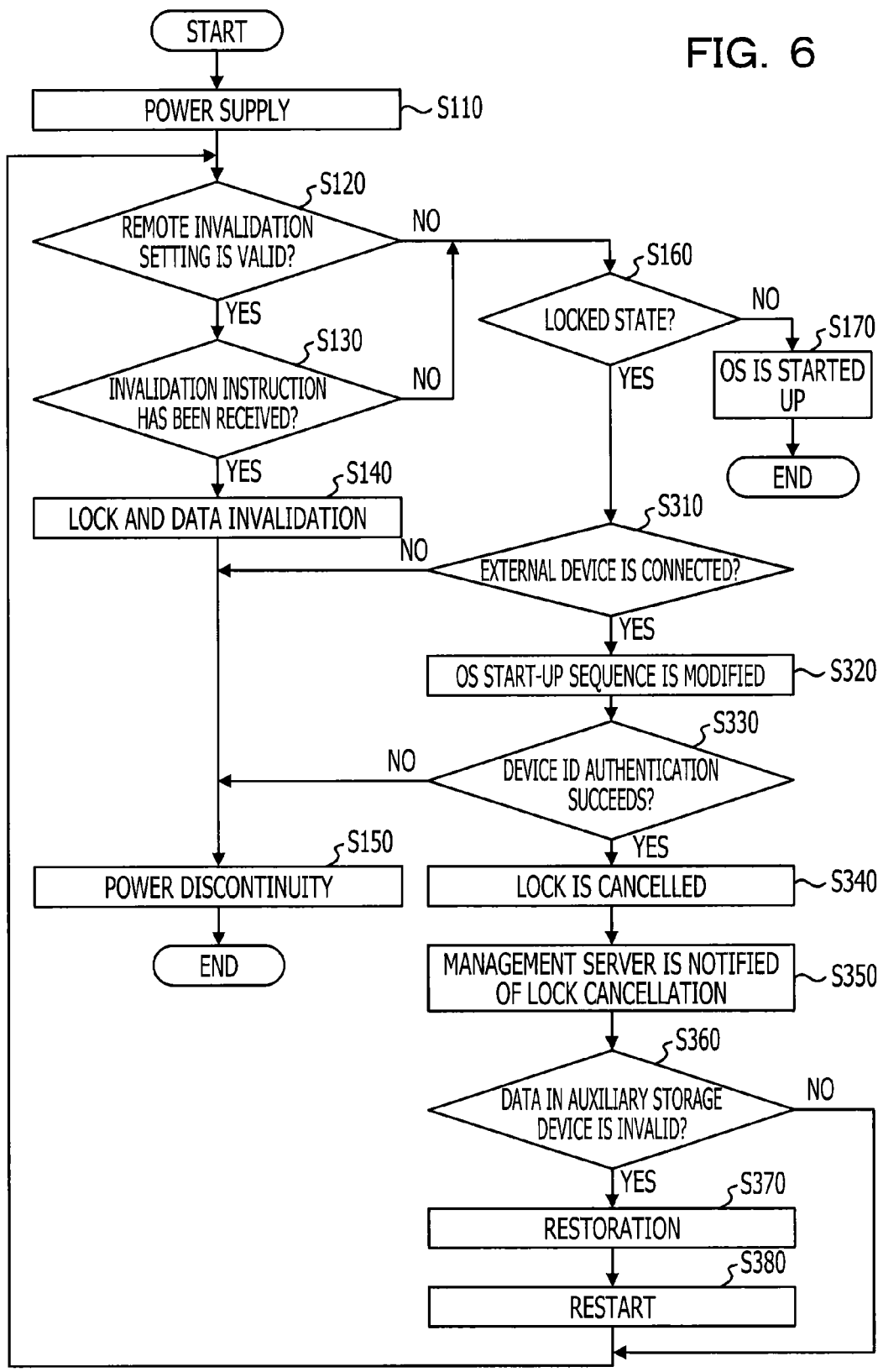
FIG. 6 is a diagram illustrating a flowchart of an example of a procedure of restoration processing for data of the information processing device in the first embodiment.

Subsequently, restoration processing for data of the information processing device 10, which has been backed up to the external device 20, will be described. FIG. 6 is a diagram illustrating a flowchart of an example of a procedure of restoration processing for data of an information processing device in the first embodiment. In FIG. 6, the same number will be assigned to the same processing as in FIG. 4, and the description thereof will be omitted.

In the case where the remote invalidation setting is invalid (S120: No) or the invalidation instruction has not been received (S130: No), and when the information processing device 10 is in a locked state (S160: Yes), processing in S310 and later is executed. In other words, when power has been supplied to the information processing device 10 by a user after S140 and S150 have been executed, processing in S310 and later is executed.

In S310, the start-up control unit 11 confirms whether or not the external device 20 is connected to the information processing device 10 via the communication line N1 (S310). When the external device 20 is not connected to the information processing device 10 (S310: No), the start-up control unit 11 puts the information processing device 10 into a state of power discontinuity (S150).

When the external device 20 is connected to the information processing device 10 (S310: Yes), the start-up control unit 11 modifies the start-up sequence of the OS, and transfers the control of start-up processing to the restoration program stored in the restoration program storage area 222 of the HDD 22 in the external device 20 (S320). In other words, in S320, the restoration program is loaded into the memory device 103 from the restoration program storage area 222 of the HDD 22 in the external device 20. When having been loaded into the memory device 103, the restoration program causes the CPU 104 to function as the restoration processing unit 16.

In S330, the restoration processing unit 16 is subjected to authentication by the access right management unit 21 in the external device 20. Specifically, the restoration processing unit 16 transmits, to the access right management unit 21, an authentication request including the device ID of the information processing device 10. The access right management unit 21 determines whether or not the received device ID coincides with the device ID set in the authentication information storage area 221.

When the device ID received by the access right management unit 21 does not coincide with the device ID set in the authentication information storage area 221, the authentication fails (S330: No). As a result, the restoration processing unit 16 is not allowed to access the backup image storage area 223. Therefore, the restoration processing unit 16 puts the information processing device 10 into a state of power discontinuity (S150).

When the device ID received by the access right management unit 21 coincides with the device ID set in the authentication information storage area 221, the authentication succeeds (S330: Yes). As a result, the restoration processing unit 16 is allowed to access the backup image storage area 223. Therefore, the restoration processing unit 16 cancels the lock put in S140 (S340). Specifically, for example, the parameter relating to the start-up processing of the BIOS, rewritten in S140, is restored to an original state, and hence, the cancellation of the lock is realized.

Subsequently, the restoration processing unit 16 causes the interface device 105 to transmit a notification of the cancellation of the lock to the management server 30 (S350). The management server 30 having transmitted the invalidation instruction to the information processing device 10 recognizes that the state of the information processing device 10 is a state of being locked. Accordingly, the management server 30 is notified that the lock has been cancelled and hence, the recognition of the state of the information processing device 10, which the management server 30 has, is caused to coincide with the actual state of the information processing device 10.

Subsequently, the restoration processing unit 16 confirms whether or not data stored in the auxiliary storage device 102 has been invalidated (S360). The reason is that while the data has not been invalidated, valid data is caused not to be overwritten owing to subsequent restoration processing. By referring to a stored content of a predetermined sector in the auxiliary storage device 102, it may be possible to determine whether or not the data stored in the auxiliary storage device 102 has been invalidated.

When data stored in the auxiliary storage device 102 has not been invalidated (S360: No), S370 and S380 are not executed. When the data stored in the auxiliary storage device 102 has been invalidated (S360: Yes), the restoration processing unit 16 restores data stored in the backup image storage area 223 of the HDD 22 in the external device 20, on the auxiliary storage device 102 (S370). Subsequently, the restoration processing unit 16 restarts the information processing device 10 (S380).

In the case of No in S360 or after S380, processing in S120 and later is executed. In this case, since the lock of the information processing device 10 has been cancelled, the determination in S160 is No. Accordingly, the OS of the information processing device 10 is started up (S170), and it may be possible for a user to use the information processing device 10. When processing in S120 and later has been executed after S380, the OS started up in S170 is the OS restored in S370. In other words, in this case, data available after the start-up of the OS is the data that has been backed up to the external device 20.

As the HDD 22 in the external device 20, an HDD 22 compliant with the specification, called Opal, of Trusted Computing Group (TCG) may be used. In this case, it is desirable that, in the Opal, a safe and secure area accessible for only a user having an access right is used as the backup image storage area 223. In addition, it is desirable that, in the Opal, an area storing therein a user ID having the above-mentioned access right (namely, the identification information of an access right owner) is used as the authentication information storage area 221. In other words, in the present embodiment, as the user ID having the access right, the device ID of the information processing device 10 is set. Accordingly, only the information processing device 10 having backed up data to the HDD 22 in the external device 20 is allowed to access the backup image storage area 223.

In addition, it is desirable that a PBA area in the Opal is used as the restoration program storage area 222. In the present embodiment, since the restoration program requests authentication based on the device ID to the access right management unit 21, it is desirable that the restoration program is loadable regardless of the presence or absence of the access right. Since the PBA area is an area loadable regardless of the presence or absence of the access right, the PBA area may be suitable as the storage area of the restoration program.

As described above, according to the first embodiment, it may be possible to safely simplify restoration work of data of the information processing device 10, which is remotely invalidated by the management server 30. In other words, when the information processing device 10 considered to be lost has returned, a user only needs to connect the information processing device 10 to the external device 20 and start up the information processing device 10 so that the data of the information processing device 10 is restored. At this time, only when the device ID of the information processing device 10 coincides with the device ID set in the external device 20 at the time of the backup, the restoration is executed. In other words, when an information processing device 10 other than the information processing device 10 serving as the backup source is connected, the execution of the restoration is suppressed. Accordingly, it may be possible to safely perform restoration.

Next, a second embodiment will be described. In the second embodiment, a point different from the first embodiment will be described. Accordingly, a point not especially referred to may be the same as the first embodiment.

Figure 7:
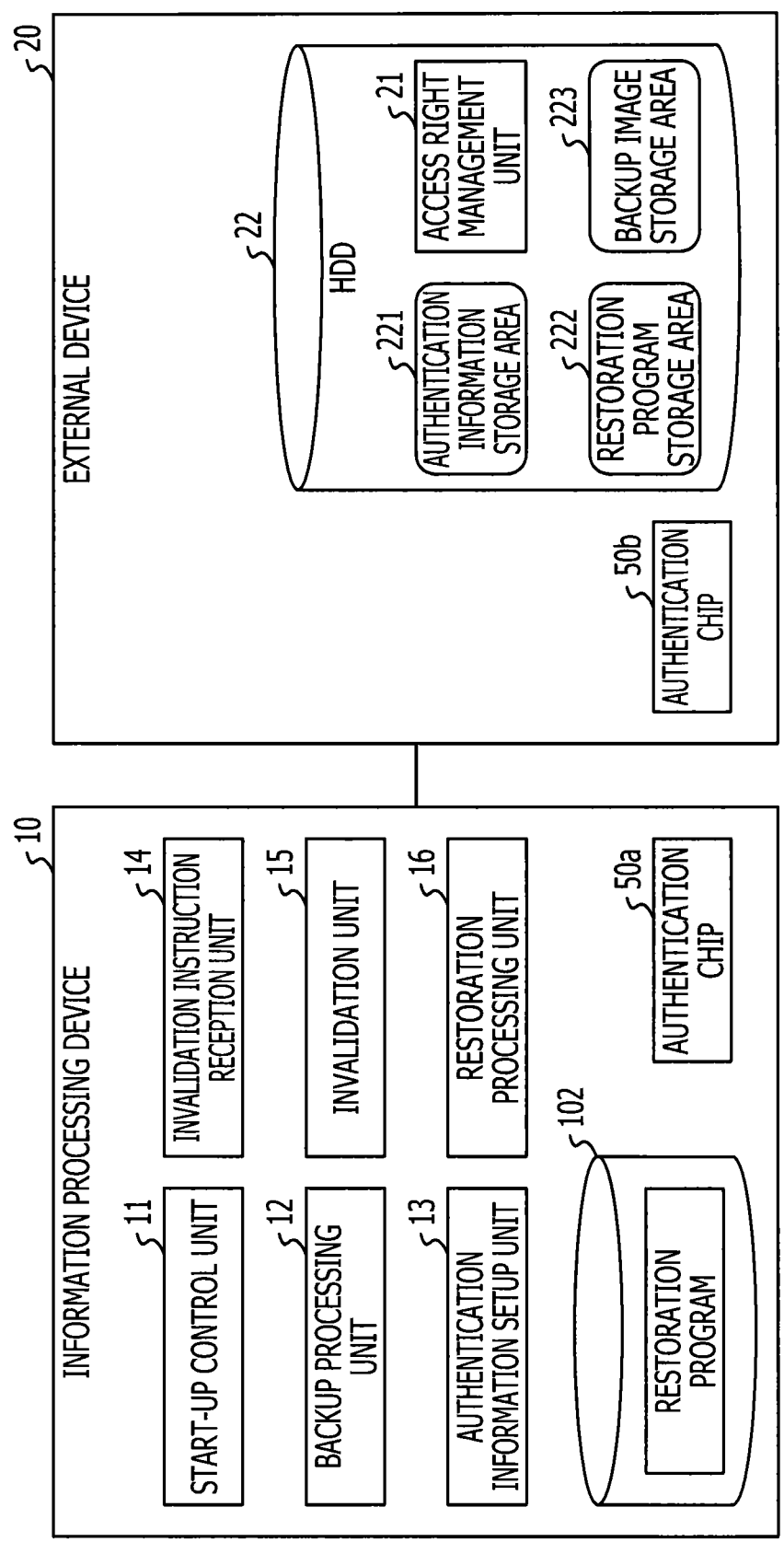
FIG. 7 is a diagram illustrating an example of a functional configuration of each device in a second embodiment.

FIG. 7 is a diagram illustrating an example of a functional configuration of each device in the second embodiment. In FIG. 7, the same number will be assigned to the same element as in FIG. 3, and the description thereof will be omitted.

In FIG. 7, the information processing device 10 includes an authentication chip 50a. The authentication chip 50a is a semiconductor integrated circuit (IC) used for authenticating that the external device 20 is an authorized backup destination for the information processing device 10.

On the other hand, the external device 20 includes an authentication chip 50b. The authentication chip 50b is an IC used for authenticating that the HDD 22 is not detached from the external device 20. For example, such a chip as described in "http://techon.nikkeibp.co.jp/NEAD/focus/infineon/infineon_1.html" may be used as the authentication chip 50a and the authentication chip 50b.

Figure 8:
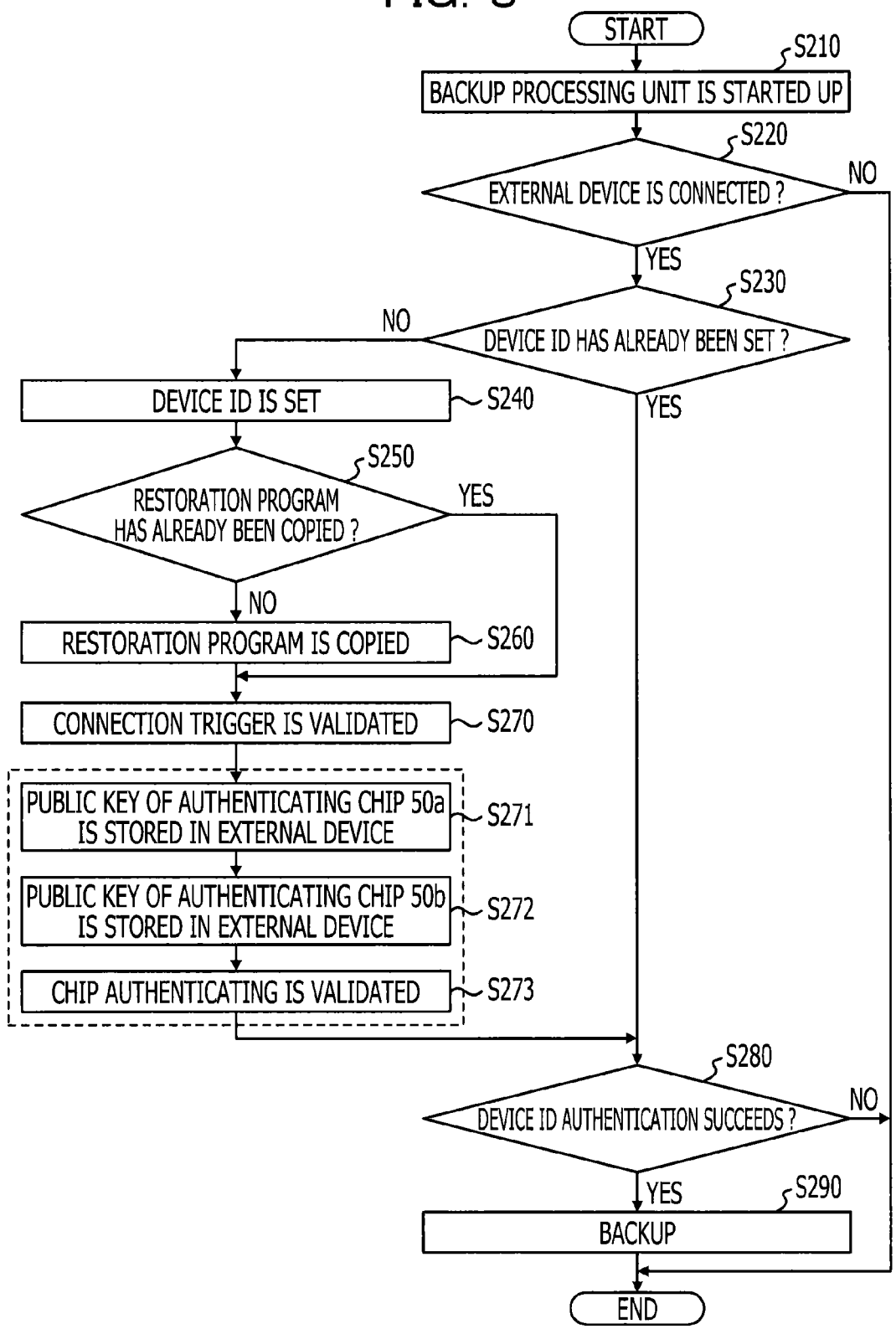
FIG. 8 is a diagram illustrating a flowchart of an example of a procedure of backup processing for data of an information processing device in the second embodiment.

FIG. 8 is a diagram illustrating a flowchart of an example of a procedure of backup processing for data of an information processing device in the second embodiment. In FIG. 8, the same number will be assigned to the same processing as in FIG. 5, and the description thereof will be omitted. In FIG. 8, S271 to S273 are added.

In S271, the backup processing unit 12 acquires (reads) a public key from the authentication chip 50a, and stores the public key in a predetermined area of the HDD 22 in the external device 20. Subsequently, the backup processing unit 12 acquires (reads) a public key from the authentication chip 50b, and stores the public key in a predetermined area of the HDD 22 in the external device 20 (S272). For example, when the HDD 22 in the external device 20 is compliant with the Opal, it is desirable that a Data Store Table serving as a secure data area is used as the predetermined area, in the HDD 22.

Subsequently, the backup processing unit 12 validates chip authentication (S273). The term "chip authentication" means authentication processing utilizing the authentication chip 50a or the authentication chip 50b. The term "validating chip authentication" means, for example, storing information indicating that the chip authentication is valid, in the storage area of the BIOS in the information processing device 10.

Figure 9A:
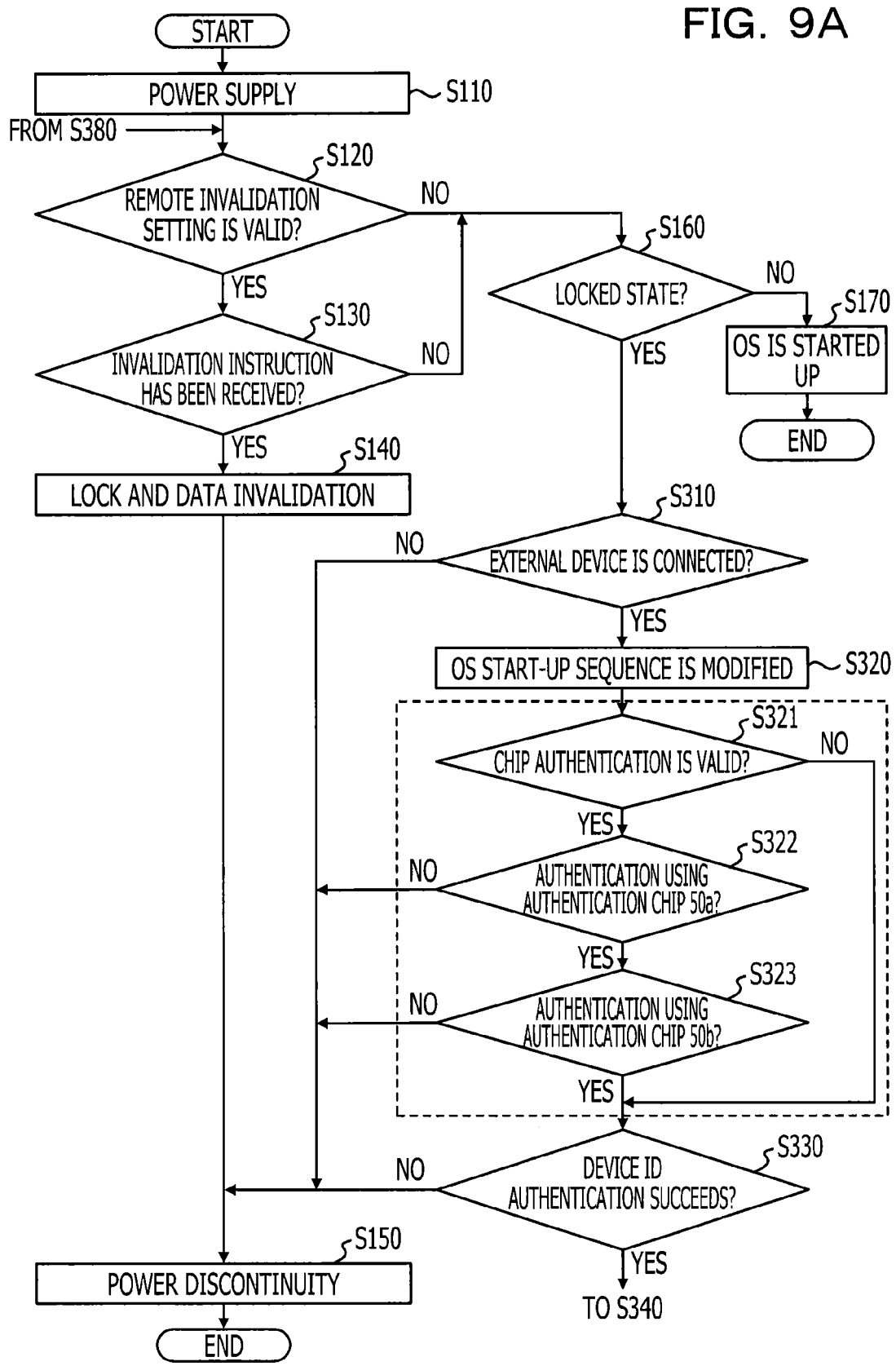
FIGS. 9A and 9B are diagrams illustrating a flowchart of an example of a procedure of restoration processing for data of the information processing device in the second embodiment.
Figure 9B:
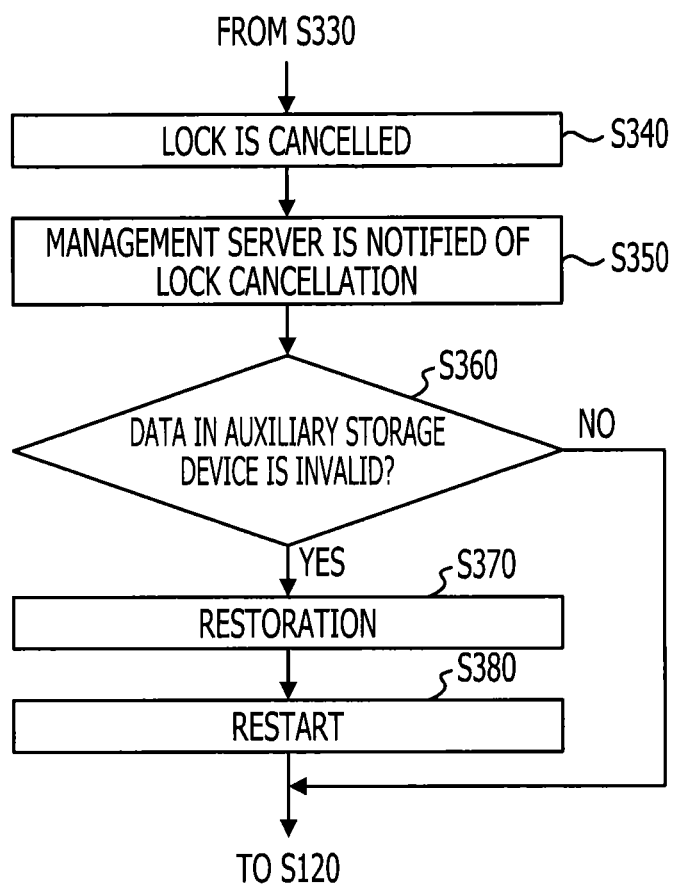

Subsequently, restoration processing for data of the information processing device 10, which has been backed up to the external device 20, will be described. FIGS. 9A and 9B are diagrams illustrating a flowchart of an example of a procedure of restoration processing for data of an information processing device in the second embodiment. In FIGS. 9A and 9B, the same number will be assigned to the same processing as in FIG. 6, and the description thereof will be omitted. In FIG. 9A, S321 to S323 are added.

After S320, the restoration processing unit 16 determines whether or not chip authentication is valid. For example, it is determined whether or not information indicating that the chip authentication is valid is stored in the storage area of the BIOS in the information processing device 10.

When the chip authentication is not valid (S321: No), the processing proceeds to S330. When the chip authentication is valid (S321: Yes), the restoration processing unit 16 executes authentication processing utilizing the authentication chip 50a (S322). Specifically, for example, the restoration processing unit 16 acquires the public key (hereinafter, referred to as a "public key_A") of the authentication chip 50a from the HDD 22 in the external device 20. Subsequently, the restoration processing unit 16 generates a random number and generates transmission data on the basis of the random number, the public key_A, and an encryption algorithm. The restoration processing unit 16 transmits the transmission data to the authentication chip 50a. In response to the reception of the transmission data, the authentication chip 50a generates response data on the basis of a secret key held in the authentication chip 50a and an encryption algorithm, and sends back the response data to the restoration processing unit 16. The restoration processing unit 16 performs authentication on the basis of comparison between the transmission data and the response data. When having failed in the authentication (S322: No), the start-up control unit 11 puts the information processing device 10 into a state of power discontinuity (S150).

According to the authentication utilizing the authentication chip 50a, it may be possible to confirm whether or not the external device 20 connected to the information processing device 10 is the backup destination of the information processing device 10. In other words, if the connected external device 20 is not the backup destination of the information processing device 10, the public key acquired from the external device 20 is different from the public key of the authentication chip 50a in the information processing device 10. Accordingly, the authentication fails. As a result, it may be possible for the restoration processing unit 16 to detect that the connected external device 20 is not the backup destination of the information processing device 10.

When having succeeded in the authentication utilizing the authentication chip 50a (S322: Yes), the restoration processing unit 16 executes authentication processing utilizing the authentication chip 50b in the external device 20 (S323). The authentication processing is the same as S323, except that the public key of the authentication chip 50b stored in the HDD 22 in the external device 20 and the authentication chip 50b are used. That is, the restoration processing unit 16 acquires the public key (hereinafter, referred to as a "public key_B") of the authentication chip 50b from the HDD 22 in the external device 20. Subsequently, the restoration processing unit 16 generates a random number and generates transmission data on the basis of the random number, the public key_B, and an encryption algorithm. The restoration processing unit 16 transmits the transmission data to the authentication chip 50b. In response to the reception of the transmission data, the authentication chip 50b generates response data on the basis of a secret key held in the authentication chip 50b and an encryption algorithm, and sends back the response data to the restoration processing unit 16. The restoration processing unit 16 performs authentication on the basis of comparison between the transmission data and the response data. When having failed in the authentication (S323: No), the start-up control unit 11 puts the information processing device 10 into a state of power discontinuity (S150). When the authentication has succeeded (S323: Yes), the processing proceeds to S330.

According to the authentication processing utilizing the authentication chip 50b, when the HDD 22 has been detached from the external device 20 and restoration is tried, it may be possible to detect that effect. For example, it is assumed that the HDD 22 has been detached from a first external device 20 and connected to a second external device 20. In this case, the public key_B acquired from the HDD 22 is different from the public key of the authentication chip 50b in the second external device 20. Accordingly, authentication fails. As a result, it may be possible to detect that the combination of the external device 20 and the HDD 22 is different from that at the time of the backup. When the combination of the external device 20 and the HDD 22 is different from that at the time of the backup, the possibility of a fraudulent act may be considered. Accordingly, by preventing restoration in such a case, it may be possible to keep data from being fraudulently restored.

As described above, according to the second embodiment, using the authentication chip 50a and the authentication chip 50b, it may be possible to further improve the safety of restoration relating to data backed up to the external device 20.

Next, a third embodiment will be described. In the third embodiment, a point different from the first embodiment will be described. Accordingly, a point not especially referred to may be the same as the first embodiment.

Figure 10:
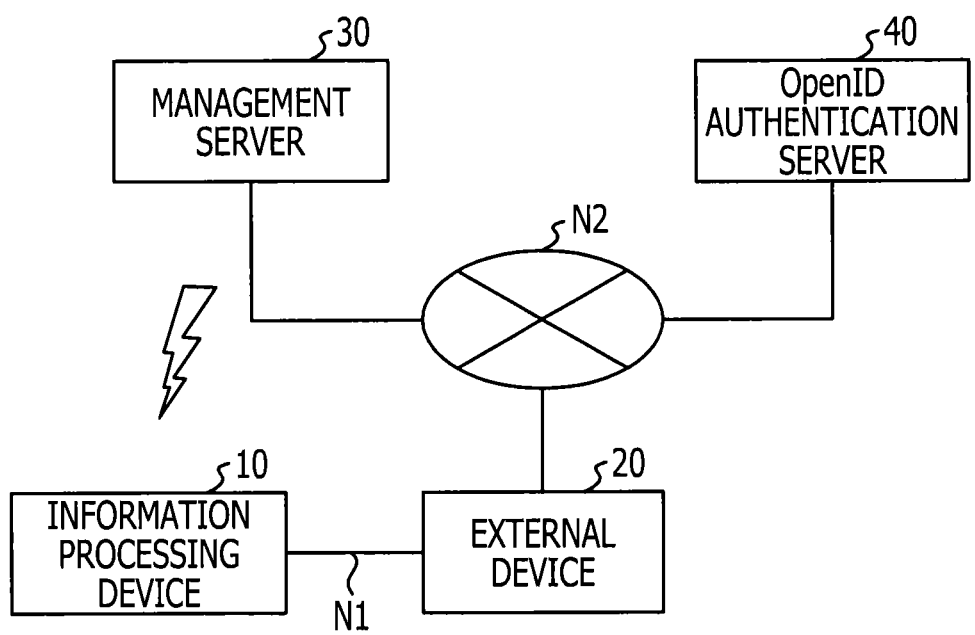
FIG. 10 is a diagram illustrating an example of a system configuration of a third embodiment.

FIG. 10 is a diagram illustrating an example of a system configuration of the third embodiment. In FIG. 10, the same number will be assigned to the same element as in FIG. 1, and the description thereof will be omitted.

In FIG. 10, an OpenID authentication server 40 is a computer executing OpenID authentication. The term "OpenID authentication" means authentication utilizing authentication information (a user ID and a password) set for a Website a user frequently accesses. The OpenID authentication server 40 is a computer executing authentication processing of a specific Website the user frequently accesses.

The external device 20 is connected to the network N2. It is possible for the information processing device 10 to communicate with the management server 30 or the OpenID authentication server 40 via the external device 20.

Figure 11:
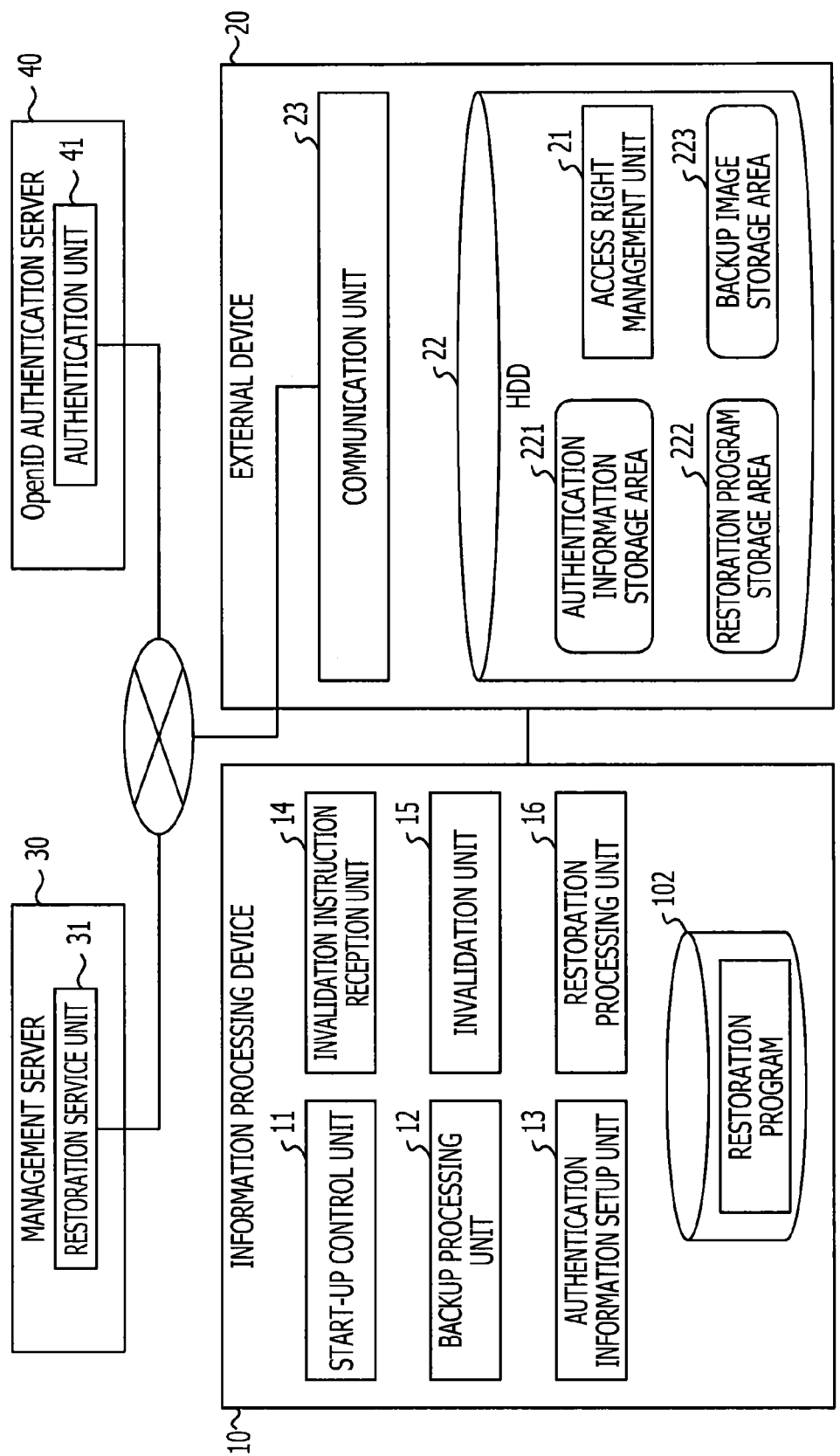
FIG. 11 is a diagram illustrating an example of a functional configuration of each device in the third embodiment.

FIG. 11 is a diagram illustrating an example of a functional configuration of each device in the third embodiment. In FIG. 11, the same number will be assigned to the same element as in FIG. 3, and the description thereof will be omitted.

In FIG. 11, the external device 20 includes a communication unit 23. The communication unit 23 controls communication performed by the information processing device 10 with the management server 30 or the OpenID authentication server 40.

The management server 30 includes a restoration service unit 31. The restoration service unit 31 calculates a hash value for the HDD 22 in the external device 20.

The OpenID authentication server 40 includes an authentication unit 41. The authentication unit 41 executes OpenID authentication. In the present embodiment, the authentication unit 41 executes authentication relating to the usage of the restoration service unit 31. In other words, authentication is required for the usage of the restoration service unit 31. Here, the reason why not a user ID and a password but the OpenID authentication is used for the restoration service unit 31 is because the convenience of a user is considered. In other words, even if it is possible to set a user ID and a password for the restoration service unit 31 and a user has set the user ID and password, it is less likely that the user memorizes the user ID and password. On the other hand, it is more likely that the user memorizes a user ID and a password for a Website the user frequently accesses. Therefore, in the present embodiment, it is assumed that the OpenID authentication is available for the restoration service unit 31.

FIG. 12 is a diagram illustrating a flowchart of an example of a procedure of backup processing for data of an information processing device in the third embodiment. In FIG. 12, the same number will be assigned to the same processing as in FIG. 5, and the description thereof will be omitted. In FIG. 12, S241 to S243 are added.

In S241, the authentication information setup unit 13 sets a BIOS password of the information processing device 10 in the authentication information storage area 221 of the HDD 22 in the external device 20. The BIOS password is a password caused to be input at the time of start-up of the BIOS. When the password is correct, the start-up of the BIOS is executed. In the present embodiment, in the same way as the device ID, such a BIOS password is used as the identification information of the device of the information processing device 10.

Subsequently, the authentication information setup unit 13 acquires the ID of the HDD 22 in the external device 20, and calculates a hash value of the ID. The authentication information setup unit 13 sets the hash value in the authentication information storage area 221 of the HDD 22 in the external device 20 (S242).

Subsequently, the authentication information setup unit 13 accepts authentication information of the OpenID authentication from a user (S243). The authentication information is input, for example, via a screen displayed on the display device 106 by the authentication information setup unit 13. The authentication information of the OpenID authentication includes a uniform resource locator (URL) of the OpenID authentication server 40 and a password for the OpenID authentication. The user ID relating to the OpenID authentication is included as option information for the URL of the OpenID authentication server 40. The authentication information setup unit 13 sets the input authentication information, in the processing environment of the restoration program. For example, the authentication information is written into a file specified in the restoration program. In S260, the file is copied to the restoration program storage area 222 along with the restoration program.

Figure 13A:
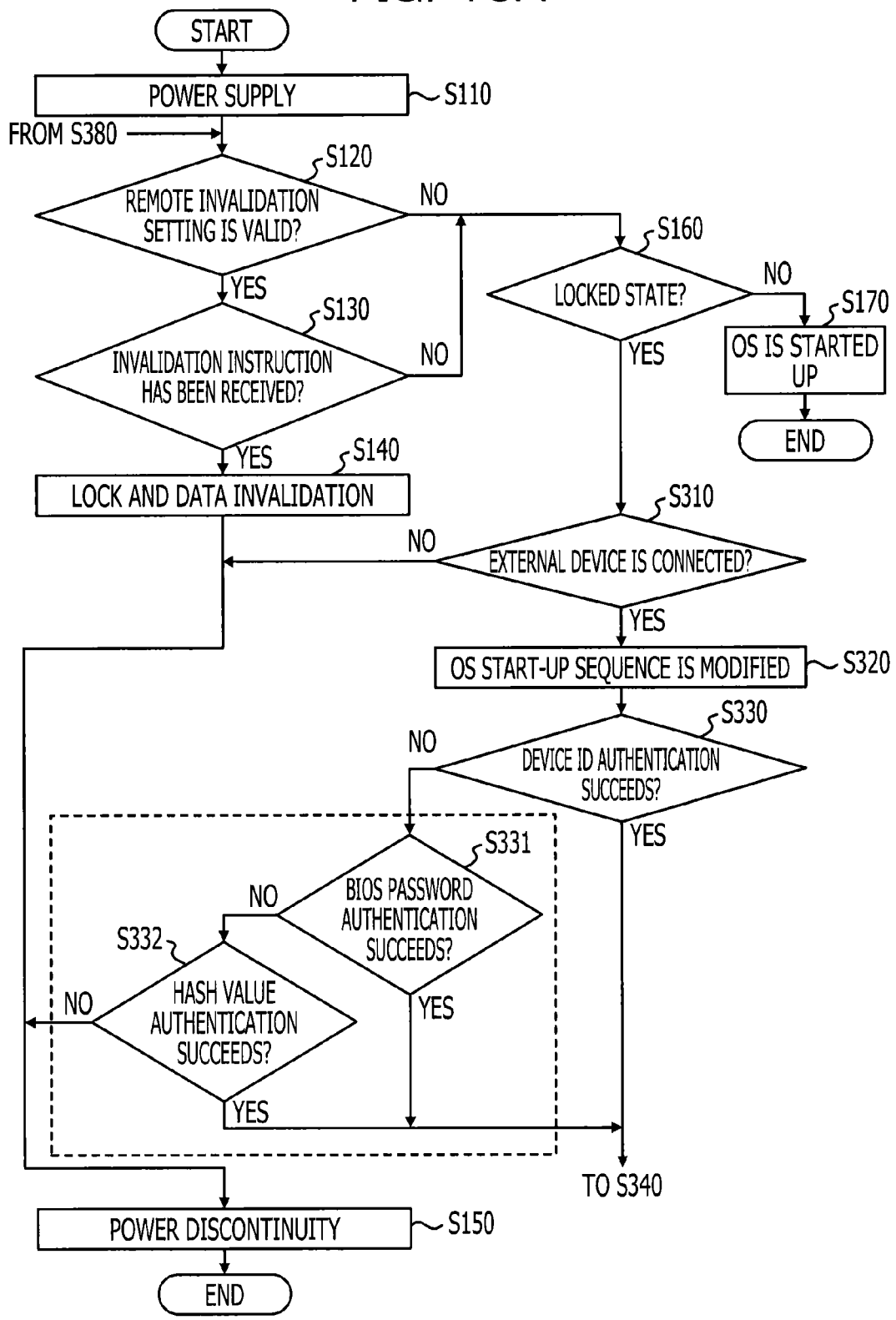
FIGS. 13A and 13B are diagrams illustrating a flowchart of an example of a procedure of restoration processing for data of the information processing device in the third embodiment.
Figure 13B:
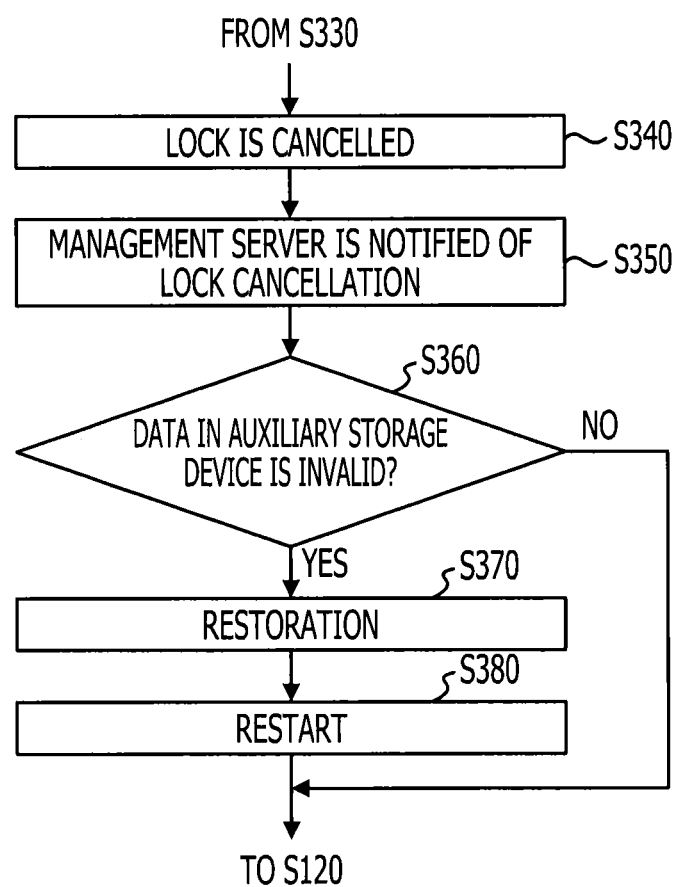

Subsequently, restoration processing for data of the information processing device 10, which has been backed up to the external device 20, will be described. FIGS. 13A and 13B are diagrams illustrating a flowchart of an example of a procedure of restoration processing for data of an information processing device in the third embodiment. In FIGS. 13A and 13B, the same number will be assigned to the same processing as in FIG. 6, and the description thereof will be omitted.

In the third embodiment, even if authentication based on the device ID has failed, S150 is not immediately executed but S331 and S332 are executed.

In S331, the restoration processing unit 16 is subjected to authentication by the access right management unit 21 in the external device 20, with respect to the BIOS password of the information processing device 10. Specifically, the restoration processing unit 16 transmits, to the access right management unit 21, an authentication request including the BIOS password of the information processing device 10. The access right management unit 21 determines whether or not the received BIOS password coincides with the BIOS password set in the authentication information storage area 221.

When the BIOS password received by the access right management unit 21 coincides with the BIOS password set in the authentication information storage area 221, the authentication succeeds (S331: Yes). When the authentication has succeeded, processing in S340 and later is executed.

On the other hand, when the BIOS password received by the access right management unit 21 does not coincide with the BIOS password set in the authentication information storage area 221, the authentication fails (S331: No). In this case, the restoration processing unit 16 executes authentication processing utilizing the hash value of the ID of the HDD 22 in the external device 20 (S332). The detail of the authentication processing will be described later. When the authentication has failed (S332: No), S150 is executed. When the authentication has succeeded (S332: Yes), processing in S340 and later is executed.

According to the third embodiment, when authentication based on any one of the device ID, the BIOS password, and the hash value has succeeded, the restoration is executed. Accordingly, by increasing the success rate of authentication, it may be possible to reduce the trouble (another round of restoration work or the like) of a user at the time of restoration.

Subsequently, the detail of S332 will be described. FIG. 14 is a sequence diagram illustrating an example of a procedure of authentication processing utilizing a hash value.

In S401, the restoration processing unit 16 transmits the URL of the OpenID authentication server 40 to the restoration service unit 31 in the management server 30. Hereinafter, the URL is referred to as an "OpenID_URL". The OpenID_URL has been input by a user in S243 in FIG. 12, and set in the processing environment of the restoration program. Accordingly, the user ID is included in the option information of the OpenID_URL.

Subsequently, the restoration service unit 31 transmits an authentication request addressed to the OpenID_URL (S402). The authentication request is received by the authentication unit 41 in the OpenID authentication server 40. In response to the reception of the authentication request, the authentication unit 41 transmits, to the information processing device 10, a request for transmitting a password (S403). The IP address of the information processing device 10 is given notice of by the restoration service unit 31, for example, in S402.

Subsequently, the restoration processing unit 16 in the information processing device 10 transmits a password set in the processing environment of the restoration program, to the authentication unit 41 in the OpenID authentication server 40 (S404). On the basis of the received password and the user ID included in the OpenID_URL, the authentication unit 41 executes authentication processing (S405). In other words, authentication is executed on the basis of the user ID and the password for a Website the user frequently accesses. Subsequently, the authentication unit 41 sends back a response including an authentication result, to the restoration service unit 31 in the management server 30 (S406). When the authentication result indicates success of the authentication, the restoration service unit 31 allows the restoration processing unit 16 to use the restoration service unit 31. When the authentication result indicates failure of the authentication, the restoration service unit 31 does not allow the restoration processing unit 16 to use the restoration service unit 31. Subsequently, the restoration service unit 31 sends back, to the restoration processing unit 16, a response indicating whether or not usage is allowed (S407).

When the usage of the restoration service unit 31 is not allowed, the restoration processing unit 16 determines that the authentication based on the hash value has failed. On the other hand, when the usage of the restoration service unit 31 has been allowed, the restoration processing unit 16 acquires the ID of the HDD 22 from the external device 20 (S408 and S409). Subsequently, the restoration processing unit 16 transmits the acquired ID of the HDD 22 to the restoration service unit 31 (S410).

The restoration service unit 31 calculates the hash value of the ID (S411). Subsequently, the restoration service unit 31 sends back the hash value to the restoration processing unit 16 (S412). Subsequently, on the basis of the hash value, the restoration processing unit 16 is subjected to authentication by the access right management unit 21 in the external device 20. Specifically, the restoration processing unit 16 transmits, to the access right management unit 21, an authentication request including the hash value (S413). The access right management unit 21 determines whether or not the received hash value coincides with the hash value set in the authentication information storage area 221. When the hash value received by the access right management unit 21 does not coincide with the hash value set in the authentication information storage area 221, the authentication fails. On the other hand, when the hash value received by the access right management unit 21 coincides with the hash value set in the authentication information storage area 221, the authentication succeeds. The access right management unit 21 sends back the result of the authentication to the restoration processing unit 16 (S414).

On the basis of the authentication result, the restoration processing unit 16 determines whether the authentication based on the hash value has succeeded or failed.

By the authentication based on the hash value, it may be possible to confirm whether or not the HDD 22 in the external device 20 is an authorized backup destination of the backup image of the information processing device 10. It is assumed that a hash function utilized by the restoration processing unit 16 is the same as a hash function utilized by the restoration service unit 31.

As example of the information processing device 10, a notebook type or desktop type of a personal computer (PC), a mobile phone, a smartphone, a tablet terminal, or the like may be cited. Even a desktop PC has a possibility of being stolen. When considering this possibility, the characteristic of being portable may be ignored with respect to the information processing device 10.

In the present embodiment, the device ID, the public key of the authentication chip 50*a*, the BIOS password, and the like are examples of device identification information. The ID of the HDD 22, the public key of the authentication chip 50*b*, and the like are examples of the identification information of hardware included in the external device 20.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising,
 a first storage unit; and
 a processor configured to
  set, in an external device, device identification information of the information processing device,
  store a duplicate copy of uncorrupted data stored in the first storage unit in a second storage unit included in the external device,
  invalidate the uncorrupted data, by making the data stored in the first storage unit inaccessible, in response to an instruction for invalidating data,
  load a restoration program from the external device,
  restore, by executing the restoration program, the duplicate copy of uncorrupted data stored in the second storage unit on the first storage unit at a time of start-up of the information processing device and after an instruction for invalidating the uncorrupted data, when the external device is connected to the information processing device and the device identification information of the information processing device corresponds to the device identification information set in the external device at the time of storing the duplicate copy of the uncorrupted data in the external device,
  validate, upon storing the duplicate copy in the second storage unit, a connection trigger to validate modification of setting information of a basic input/output system so that an utmost priority is placed on the external device when the external device is detected to be connected, and
  modify, upon detecting that the external device is connected, a start-up sequence of an operating system to transfer control of start-up processing to the restoration program stored in the external device.

2. The information processing device according to claim 1, wherein
 the external device allows access to the external device when identification information that coincides with reference identification information set in the external device has been input, and
 the processor is further configured to
  set the device identification information as the reference identification information in the external device, and
  restore the duplicate copy of uncorrupted data stored in the second storage unit on the first storage unit at the time of start-up of the information processing device when the external device connected to the information processing device has allowed to access the external device in response to input of the device identification information.

3. The information processing device according to claim 1, wherein
 the processor is further configured to
  set, in the external device, identification information of hardware included in the external device, and
  restore the duplicate copy of uncorrupted data stored in the second storage unit on the first storage unit at the time of start-up of the information processing device when the identification information of the hardware has been set in the external device connected to the information processing device.

4. A data management method executed by an information processing device including a first storage unit, the data management method comprising:

setting, in an external device, device identification information of the information processing device;

storing, by the information processing device, a duplicate copy of uncorrupted data stored in the first storage unit in a second storage unit included in the external device;

invalidating the uncorrupted data, by making the data stored in the first storage unit inaccessible, in response to an instruction for invalidating data;

loading a restoration program from the external device;

restoring, by executing the restoration program, the duplicate copy of uncorrupted data stored in the second storage unit on the first storage unit, at a time of start-up of the information processing device and after an instruction for invalidating the uncorrupted data, when the external device is connected to the information processing device and the device identification information of the information processing device corresponds to the device identification information set in the external device at the time of storing the duplicate copy of the uncorrupted data in the external device, validating, upon storing the duplicate copy in the second storage unit, a connection trigger to validate modification of setting information of a basic input/output system so that an utmost priority is placed on the external device when the external device is detected to be connected; and modifying, upon detecting that the external device is connected, a start-up sequence of an operating system to transfer control of start-up processing to the restoration program stored in the external device.

5. The data management method according to claim 4, wherein the external device allows access to the external device when identification information that coincides with reference identification information set in the external device has been input, the data management method further comprising:

setting the device identification information as the reference identification information in the external device; and restoring the duplicate copy of uncorrupted data stored in the second storage unit on the first storage unit at the time of start-up of the information processing device when the external device connected to the information processing device has allowed to access the external device in response to input of the device identification information.

6. The data management method according to claim 4, further comprising:

setting, in the external device, identification information of hardware included in the external device; and restoring the duplicate copy of uncorrupted data stored in the second storage unit on the first storage unit at the time of start-up of the information processing device when the identification information of the hardware has been set in the external device connected to the information processing device.

* * * * *